2,755,313

MANUFACTURE OF SATURATED HALOCARBONS

John D. Calfee, Dayton, Ohio, Charles B. Miller, Lynbrook, N. Y., and Lee B. Smith, Woodbridge, N. J., assignors to Allied Chemical & Dye Corporation, New York, N. Y., a corporation of New York No Drawing. Application August 3, 1951,
Serial No. 240,287

4 Claims. (Cl. 260—653)

This invention relates to preparation of saturated fluorinated halocarbons having two carbon atoms, which compounds are useful generally as chemical intermediates.

According to known methods for preparing saturated fluorinated halocarbons, starting materials such as hexachloroethane, $C_2Cl_6$ or tetrachlorodifluoroethane, $$CCl_3CClF_2$$

have been treated with liquid fluorinating agents such as antimony halide salts. Such procedures suffer from many disadvantages among which are the difficulty of obtaining $C_2Cl_6$ in the liquid phase, the corrosiveness of the antimony halide catalysts and the difficulty and complexity of operation involved by reason of the use of a liquid catalyst as distinguished from a solid catalyst. Hence, objects of the present invention include development of a completely gas phase method for preparing such fluorinated halocarbons having two carbon atoms, by employing a novel and advantageous solid catalyst.

According to the present invention, a volatilizable two carbon atom compound, i. e. a hydrocarbon derivative, containing an unsaturated carbon to carbon linkage, mixed with gaseous HF and free chlorine, is contacted in the gas phase and under certain hereinafter defined conditions with aluminum fluoride catalyst of extremely small crystal size (i. e. composed of crystallites). By such procedure, the hydrocarbon derivative starting material (which term includes the hydrocarbons themselves) is fluorinated to sought-for saturated halocarbon product.

Of the starting materials indicated, either acetylenes (compounds having the acetylenic (C≡C) linkage) or ethylenes (compounds having the ethylenic C=C linkage) may be employed, but the latter are preferred. Halogen-containing ethylenes may be mentioned as particularly suitable starting material, especially those having not more than two hydrogen atoms per molecule and the balance halogen, i. e. two carbon atoms compounds consisting of carbon, hydrogen and halogen. Said halogen suitably consists of fluorine and/or chlorine, i. e. atomic weight less than 36. Certain advantages are afforded if the unsaturated two carbon atom compound employed as starting material contains at least one chlorine atom. Use of halogen-containing ethylenes consisting of carbon and halogen having atomic weight less than 36 as starting material forms still another preferred embodiment of the invention. $CCl_2=CCl_2$, $CCl_2=CClF$ and $CCl_2=CF_2$ are specific preferred starting materials within these groups, and $CCl=CClF$ and $CCl=CF_2$ may be used also.

The aluminum fluorides used as fluorination catalyst according to the present invention have the property of catalyzing the fluorination of the hydrocarbon derivatives described to form saturated fluorinated halocarbons to such an extent that good yields (percentage of the sought-for product recovered based on the amount of such product theoretically obtainable from the starting material converted), conversions (amount of starting material which undergoes reaction) and efficient and smooth operation may be realized under readily maintained operating conditions. Hence, when the starting material is contacted in the presence of gaseous HF and chlorine with our $AlF_3$ catalyst, fluorination to sought-for product takes place and the desired objects set forth above are realized.

Aluminum fluorides from a multiplicity of sources are known in the art. The majority of such materials consists of lumps or smaller discrete particles, which lumps or particles in turn are composed of $AlF_3$ crystals of relatively large size, i. e. not less than one thousand and usually several thousand Angstrom units radius and above as in the case of commercial types of aluminum fluoride available on the market. However, certain forms of $AlF_3$, when examined even by the highest powered optical microscope, appear to be of non-crystalline or "amorphous" structure. When such "amorphous" aluminum fluorides are examined using X-ray diffraction technique, extremely small, submicroscopic crystals, "crystallites," may be detected. According to the invention, such "amorphous" and substantially anhydrous aluminum fluorides, having crystals of certain sub-microscopic (crystallite) size, are used in the fluorination of hydrocarbon derivatives described above. Enhanced catalytic activity may be noted by use of aluminum fluorides of crystallite size of about 500 A. radius or below. As crystallite size decreases below this value, desired catalytic activity increases and particularly suitable aluminum fluorides including those having crystallite size of about 200 A. and below (as determined by X-ray diffraction technique). It has been found that by contacting the unsaturated hydrocarbon derivative mixed with HF and chlorine with the improved catalyst, transformation to saturated fluorinated halocarbon may be realized under favorable and easily maintained operating conditions. Although advantageous catalytic properties realized in practice of the invention are peculiar to crystallites, such properties are not destroyed but merely diluted by the presence of the larger crystals.

Aluminum fluorides having the indicated crystallite size and catalytic activity are included within the scope of the invention regardless of method of preparation. However, according to a particular embodiment of the invention, improved catalytic material is employed which is prepared by treating aluminum halide other than aluminum fluoride (which halide is preferably in pure form but may suitably be of commercial or technical grades) with preferably excess quantities of inorganic fluorinating agent reactive therewith under conditions such that no liquid water is present in the reacting materials. For example, catalyst may be prepared by treating solid hydrated aluminum halide with gaseous fluorinating agent (said agent being preferably, but not necessarily, anhydrous) at temperature high enough so that the water in the hydrate is volatilized into the gas, e. g. preferably above about 100° C. to 170° C., the maximum temperature for avoiding fusion depending largely upon the degree of hydration of the reactant and the water content, if any, of the fluorinating agent. If desired, anhydrous reagents may be employed, in which case maintenance of particular temperatures during the catalyst preparation reaction is not as critical and said reaction may be carried out with fluorinating agent in the liquid phase. Of the fluorinating agents which may be used for catalyst preparation, boron trifluoride and hydrofluoric acid may be mentioned. We prefer anhydrous hydrofluoric acid. Anhydrous aluminum chloride is the preferred halide. Catalyst synthesis reaction is believed to proceed as follows:

$$3HF + AlCl_3 = AlF_3 + 3HCl$$

HF displaces HCl causing transformation of $AlCl_3$ into

AlF₃. The remaining aluminum fluoride may be activated by heating in an anhydrous atmosphere at elevated temperature, i. e. temperature at which activation takes place (presumably accompanied by vaporization and removal of any amounts of water of hydration). The finished catalyst is then recovered. It has been found that heating the AlF₃ in a stream of dry nitrogen or HF gas for about one to four hours at temperatures of about 300–350° C. or four to six hours at 250–300° C. is ordinarily suitable for this purpose.

If desired, the catalyst may be activated by heating the AlF₃ in a stream of free oxygen-containing gas such as oxygen or air at about 400–600° C. for approximately 30 minutes to six and one-half hours (depending mostly on the O₂ content of the treatment gas), in which case activation with dry nitrogen or HF gas as aforesaid, may be omitted. Catalyst so activated with free oxygen gas has particular enhanced activity for fluorination of the unsaturated hydrocarbon derivatives and hence, preferred procedure for activation of AlF₃ to be used as fluorination catalyst comprises such treatment.

Although not essential to realization of the objects of the invention, a suitable and convenient procedure for preparing the aluminum fluoride catalyst is to add solid anhydrous aluminum chloride to an excess of liquefied anhydrous hydrofluoric acid in a cooled container and, after complete addition of the aluminum chloride, mildly agitate the mixture until reaction is substantially complete. The AlF₃ so prepared is then activated as outlined above. Following is an example illustrating preparation of AlF₃ catalyst according to the latter procedure.

*Example A*

300 parts of granular (8 to 18 mesh) anhydrous aluminum chloride of commercial grade were added in small portions to liquid anhydrous hydrofluoric acid contained in an externally cooled vessel. A vigorous exothermic reaction took place and additional amounts of hydrofluoric acid were added as needed to maintain an excess thereof. After all the aluminum chloride had been added, the mixture was stirred to promote residual reaction. When reaction of aluminum chloride appeared complete, the mass was mixed and stirred with additional liquid hydrofluoric acid and excess HF was removed by slowly boiling the mixture. 200 parts of anhydrous aluminum fluoride of about 10–40 mesh size having greater than 98% AlF₃ content and containing less than 0.15% chlorine were recovered. This AlF₃ was heated in in a stream of dry inert gas (nitrogen) at a sufficiently elevated temperature (250–300° C.) and a period of time sufficiently long (4–6 hours) to drive off residual amounts of water and activate the material. An X-ray diffraction pattern of material prepared according to the method outlined above, indicated crystallite size to be less than 100 Angstrom units radius, i. e. the crystallite size was so small as to be indicative of "amorphous" structure as desired for the purpose of the present invention. The mesh size distribution of the AlF₃ particles did not change appreciably during the latter heat treatment.

As indicated above a particular procedure utilizing HF gas as fluorinating agent for the AlCl₃ comprises treating anhydrous AlCl₃ or the hydrate with HF gas (preferably anhydrous) at temperature sufficiently high to cause reaction between AlCl₃ and HF and to volatilize and maintain any water present in the system in the gas phase (preferably 100–170° C., consistent with avoidance of fusion, in case the hydrate is employed), but low enough to prevent excessive volatilization of AlCl₃ (preferably below about 125° C. when anhydrous AlCl₃ is treated), and thereafter activating the AlF₃ produced. Aluminum fluoride so prepared has also been found to be composed of crystallites of size substantially below 200 A. as desired for preparation of saturated fluorinated halocarbons according to a preferred embodiment of the invention. Gas phase preparation of catalyst is illustrated by the following example, in which parts expressed are by weight:

*Example B*

600 parts of 4 to 18 mesh anhydrous aluminum chloride of commercial grade were charged to a nickel reactor and heated therein while passing through the reactor a stream of anhydrous HF gas to bring about the following reaction:

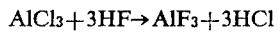

$$AlCl_3 + 3HF \rightarrow AlF_3 + 3HCl$$

The HF was admitted at sufficiently slow rate to keep the temperature in the reaction zone (exothermic reaction) below about 90° C. to prevent excessive loss of AlCl₃ by volatilization. As the reaction neared completion, as evidenced by a sharp decline in reactor temperature, heat was applied externally to the reactor and temperature raised to about 300° C. while still continuing passage of a slow stream of HF through the tube, until last traces of AlCl₃ were converted to AlF₃. The AlF₃ so formed was then activated by heating it in a stream of air at about 450–500° C. for about 30 minutes. The size and shape of the solid material was about the same before and after treatment with gaseous HF. 500 parts of anhydrous aluminum fluoride containing 98–99% AlF₃ and less than 0.10% chlorine, were recovered. An X-ray diffraction pattern of the material prepared according to the latter gas phase procedure was made which indicated crystallite size to be in the range 100–200 Angstrom units radius, the average being 140 A., i. e. the crystallite size was so small as to be indicative of "amorphous" structure as desired for fluorination of unsaturated hydrocarbon derivatives according to the present invention.

If desired, the catalyst may be used in the form of a fluidized solid bed or suspended on a non-siliceous inert carrier such as activated alumina, metal fluorides or nickel. Suitable methods for preparing this suspended catalyst include dissolving the aluminum compound in a solvent therefor, applying the solution to the carrier, evaporating the solvent and then treating the aluminum compound impregnated carrier with fluorinating agent. According to an alternative procedure, the aluminum compound, if volatile, may be heated and thereby sublimed into a gas stream and subsequently condensed on the carrier after which it is treated with fluorinating agent as above. Specifically, aluminum chloride may be dissolved in ethyl chloride or an aqueous solvent, then applied to the carrier, and subsequently treated with hydrofluoric acid, or aluminum chloride may be volatilized into a gas stream, condensed on the carrier, and then treated to convert it to aluminum fluoride.

While the mechanism of the reaction of this invention is not entirely clear, the over-all effect, when CCl₂=CCl₂ is employed as starting material and under particular operating conditions, appears to be exemplified by the following equation:

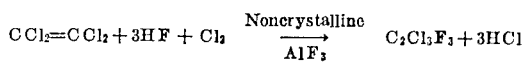

$$CCl_2 = CCl_2 + 3HF + Cl_2 \xrightarrow[AlF_3]{Noncrystalline} C_2Cl_3F_3 + 3HCl$$

Reaction zone temperatures are maintained at or above the level at which fluorination of the particular hydrocarbon derivative starting material begins to take place in the presence of gaseous HF and free chlorine. Some fluorination reaction may be noted at temperature as low as 200° C., but reaction proceeds at a more satisfactory rate at temperature of 325° C. and above. Fluorination proceeds and important yields of sought-for products may be realized at temperatures as high as about 600° C., but at about 600° C. catalyst activity is substantially impaired and for this further reason, it is advantageous to maintain reactor temperature below 600° C., preferably for reasons of economy, at or below about 500° C.

Temperature also exerts a noticeable effect upon the composition of the halocarbon produced. Higher temperatures tend to produce products having relatively greater proportion of fluorine in the molecule whereas temperatures in the lower regions of the ranges indicated above tend to favor the formation of products having relatively greater proportions of chlorine in the molecule. Hence, choice of reaction temperature will be determined to a degree by the product which is desired.

The mol ratio of HF to starting material is determined largely by the amount of fluorine desired in the sought-for product, i. e. if a highly fluorinated product is desired and the starting material is originally of low fluorine content, correspondingly large amounts of HF are introduced to the reactor with the starting material. Preferably, at least one mol of HF is used for each atom of fluorine desired to be added to the molecule of the starting material. Quantities of HF in excess of this amount favor by the effect of mass action, the formation of fluorinated product. However, ratios of HF to reactant should not be increased to the point where space velocity becomes an important factor in limiting reactor capacity as indicated below. One mol of free chlorine is preferably used for each unit of unsaturation (a double bond constituting a single unit of saturation and a triple bond two units of unsaturation) and for each atom of hydrogen in the molecule of the starting material. For example, $CCl_2=CCl_2$ would call for 1 mol of free chlorine and $CHCl=CCl_2$ would call for 2 mols of free chlorine to produce a saturated fluorohalocarbon. Smaller quantities of chlorine may be employed, but will generally lead to decreased yields of saturated products. Excess quantities of chlorine do not interfere with nor ordinarily noticeably affect the course of the reaction, but such excess quantities serve no marked useful purpose.

Time of contact of hydrocarbon derivative starting material with aluminum fluoride catalyst may be varied to some extent without noticeable sacrifice in advantageous high efficiency of operation. However, if contact time is excessive, i. e. at very low space velocities, the capacity of the reactor is low thereby causing economic disadvantages in the operation. On the other hand, if contact time is too short, i. e. at excessively high space velocities caused, e. g. by use of excessive amounts of HF and gaseous chlorine, the reaction of starting material to form desired product may be incomplete thereby entailing possible high cost of recovering and recycling unreacted material to subsequent operation. Accordingly the time of contact (space velocity) is determined by balancing the economic advantage of high reactor throughput obtained at short contact times against the cost of recovery of unreacted hydrocarbon derivative starting material. In a particular operation, optimum rate of flow of starting material through the reaction zone is dependent upon variables such as scale of operation, quantity of catalyst in the reactor and specific apparatus employed and may be best determined by a test run.

For convenience, atmospheric pressure operation is preferred, but the reaction may, if desired, be carried out at superatmospheric or subatmospheric pressure, the choice of pressure being largely one of convenience, e. g. determined by the nature of prior treatment of the starting material or subsequent treatment of the reaction product.

Generally, the process of the invention is carried out by contacting the hydrocarbon derivative starting material with an aluminum fluoride catalyst described above at temperature at which fluorination takes place in the presence of gaseous HF and free chlorine. Operations may be suitably carried out by introducing the gaseous mixture of these reactants into a reaction zone containing aluminum fluoride catalyst and heating the said material in the zone at temperatures heretofore indicated for a time sufficient to convert an appreciable amount of the hydrocarbon derivative to saturated fluorinated halocarbons, withdrawing gaseous products from the zone and recovering said halocarbon from the gaseous products. Although not limited to continuous operations, the process of our invention may be advantageously carried out thereby. The reactants heretofore indicated may be diluted with other gaseous material, e. g. an inert gas such as nitrogen, and the mixture of such inert gas and reactants introduced into the reaction zone, and fluorination of the hydrocarbon derivative carried out in the presence of aluminum fluoride catalyst to produce the above indicated products.

Various reaction products in the reaction zone exit gas stream may be recovered separately or in admixture in any suitable manner. The gas discharged from the reactor is cooled and recovered by scrubbing with water, aqueous caustic solution (if it is desired to remove residual small amounts of $Cl_2$, HCl and HF) then passed over calcium chloride or other drying agent to remove water and condensed in a vessel maintained at temperatures substantially below the boiling point of the lowest boiling material present, e. g. by indirect cooling of the gas in a bath of acetone and carbon dioxide ice. The particular materials recovered depend, as indicated above, upon starting materials and reaction conditions such as temperatures, mol ratios of reactants, etc. Individual compounds may be recovered, e. g. by distillation of condensates obtained above. Unreacted hydrocarbon derivative starting material may be recycled to subsequent operation.

Any suitable chamber or reactor tube constructed of inert material may be employed for carrying out the reaction provided the reaction zone afforded is of sufficient length and cross-sectional area to accommodate the required amount of aluminum fluoride necessary to provide adequate gas contact area, and at the same time afford sufficient free space for passage of the gas mixture at an economical rate of flow. Material such as nickel, graphite, Inconel and other materials resistant to HF may be mentioned as suitable for use as reactor tube. Externally disposed reactor tube heating means such as electrical resistance heaters may be supplied for use in instances where reaction is not strongly exothermic, e. g. when fluorinating an already highly halogenated hydrocarbon derivative.

The following examples illustrate practice of our invention, parts and percentages being by weight:

*Example 1.*—100 parts of aluminum fluoride catalyst prepared by the procedure of Example B above were arranged in a fixed bed supported on a nickel screen in a vertically mounted 0.6 inch internal diameter, 36 inches long nickel tube. The tube was externally electrically heated and the tube ends were fitted with pipe connections for the inlet and outlet of a gas stream and for the insertion into the nickel tube and catalyst bed of a suitable thermocouple. Liquid $CCl_2=CCl_2$ was vaporized, mixed with gaseous HF and free chlorine in the proportion of 3.5 mols of HF per mol $CCl_2=CCl_2$ and 0.5 mol $Cl_2$ per mol $CCl_2=CCl_2$ and the mixture introduced at the rate corresponding with 55 parts of $CCl_2=CCl_2$ per hour into the bottom of the nickel tube and passed upwardly through the bed of $AlF_3$ catalyst. By adjusting the electrical heaters thereby to control the rate of heat input in the gas stream, the temperature of the catalyst bed was maintained at about 400° C. Gaseous products of the reaction were withdrawn overhead, cooled, thence passed successively through a water scrubber, a caustic scrubber, a dryer containing $CaCl_2$ as the drying agent and a condenser held at about minus 78° C. (to separate small quantities of extremely low boiling byproducts) by means of an external cooling bath of carbon dioxide ice and acetone. After passing 108 parts $CCl_2=CCl_2$ through the nickel reactor as above, operation was discontinued. Condensates from the water scrubber and the low temperature condenser were combined, distilled, unreacted $CCl_2=CCl_2$ separated and the following amounts of products were recovered:

|  | Parts |
|---|---|
| $C_2Cl_2F_4$ (primarily $CCl_2FCF_3$) | 22 |
| $C_2Cl_3F_3$ (primarily $CCl_2FCF_2Cl$) | 7 |
| $C_2Cl_4F_2$ (primarily $CF_2ClCCl_3$) | 7 |

Substantially all of the $CCl_2=CCl_2$ and HF not converted to the above products was recoverable for re-fluorination.

*Example 2.*—Gaseous $CCl_2=CCl_2$, mixed with gaseous HF (3.28 mols per mol of $CCl_2=CCl_2$) and free chlorine (0.83 mol per mol of $CCl_2=CCl_2$), was passed through the vertical nickel tube arranged as described in Example 1 and containing 100 parts of $AlF_3$ catalyst prepared by the method outlined in Example B. Internal temperature of the tube was maintained at 350° C. and $CCl_2=CCl_2$ was introduced at the rate of about 55 parts per hour. The gas effluxing the tube was cooled, scrubbed with water, caustic dried and condensed. After so treating 609 parts of $CCl_2=CCl_2$, the condensates were distilled and recoveries were as follows:

| | Parts |
|---|---|
| $C_2Cl_3F_3$ (primarily $CCl_2FCF_2Cl$) | 221 |
| $C_2Cl_2F_4$ (primarily $CCl_2FCF_3$) | 25 |
| $C_2Cl_4F_2$ (primarily $CF_2ClCCl_3$) | 71 |

Conversion of $CCl_2=CCl_2$ was 45.5%, and of HF 40.5%, per pass. Substantially all of the $CCl_2=CCl_2$ and HF not converted to the above product was recoverable for re-fluorination.

*Example 3.*—Gaseous $CCl_2=CCl_2$ mixed with gaseous HF (3.5 mols per mol of $CCl_2=CCl_2$) and free chlorine (1.01 mol per mol of $CCl_2=CCl_2$) was passed through a nickel reaction tube arranged as described in Example 1 and containing 85 parts of $AlF_3$ catalyst prepared by the method outlined in Example B. Internal temperature of the tube was maintained at 400° C. and $CCl_2=CCl_2$ was introduced at the rate of about 55 parts per hour. Method of product recovery was similar to that described in Examples 1 and 2. After so treating 276 parts $CCl_2=CCl_2$ product recoveries were as follows: $C_2ClF_5$, 20 parts; $C_2Cl_2F_4$, 101 parts; $C_2Cl_3F_3$, 70 parts. Conversion of HF to $C_2Cl_2F_4$ was 40.5% and to $C_2Cl_3F_3$ 24%. $CCl_2=CCl_2$ and HF not converted to the above products were substantially completely recoverable for re-fluorination.

*Example 4.*—A mixture of gaseous $CCl_2=CF_2$, 1 mol of chlorine and 2.2 mols HF per mol $CCl_2=CF_2$ was passed through a nickel reaction tube of the type described in the above examples, containing 85 parts of $AlF_3$ catalyst prepared by the method outlined in Example B. Tube reactor temperature was 350° C. and $CCl_2=CF_2$ was fed at the rate of 60 parts per hour. Product recovery during a time interval in which 177 parts of $CCl_2=CF_2$ were fed, was as follows: $C_2ClF_5$ (distillation cut boiling from minus 50 to minus 24° C.), 5 grams; $C_2Cl_2F_4$ (distillation cut minus 24 to plus 14° C.), 51 parts; $CCl_2=CF_2+C_2HCl_2F_3$ (distillation cut plus 14 to plus 27° C.), 50 parts; principally $C_2Cl_3F_3$ (boiling above plus 27° C.), 36 parts. HF not converted to the above products was substantially completely recoverable for re-fluorination.

Process for making the herein described catalyst is claimed in copending application Serial No. 240,295, filed August 3, 1951, by C. Woolf and C. B. Miller, now Patent 2,673,139.

We claim:

1. The process for fluorinating $CCl_2=CCl_2$ to form a saturated two-carbon-atom chlorofluorocarbon compound consisting of carbon, chlorine and fluorine and having at least three fluorine atoms, which process comprises introducing a gas phase mixture comprising $CCl_2=CCl_2$, substantially anhydrous HF and not less than about 0.5 mol of free chlorine per mol of $CCl_2=CCl_2$ into a reaction zone containing substantially anhydrous aluminum fluoride catalyst having crystallite size not substantially greater than 500 Angstrom units radius and having been derived by reaction of aluminum chloride and HF, the amount of HF and free chlorine being sufficient to ultimately form a reaction product containing a substantial quantity of a chlorofluorocarbon compound having at least three fluorine atoms, heating said mixture in said zone at temperature in the approximate range of 325° C. to below 500° C. for a time sufficient to fluorinate a substantial amount of said $CCl_2=CCl_2$ to form a reaction product containing a substantial quantity of a chlorofluorocarbon compound containing at least three fluorine atoms, discharging from said zone gaseous reaction products containing a substantial quantity of said saturated two-carbon-atom chlorofluoro carbon compound having at least three fluorine atoms, and recovering said saturated compound having at least three fluorine atoms.

2. The process of claim 1 in which the said catalyst has a crystallite size not substantially greater than about 200 Angstrom units radius.

3. The process for fluorinating $CCl_2=CCl_2$ to form saturated two-carbon-atom chlorofluorocarbon compounds consisting of carbon, chlorine and fluorine and having at least three fluorine atoms which process comprises introducing a gas phase mixture comprising $CCl_2=CCl_2$, substantially anhydrous HF and not less than about 0.5 mol of free chlorine per mol of $CCl_2=CCl_2$ into a reaction zone containing substantially anhydrous aluminum fluoride catalyst having crystallite size not substantially greater than 500 Angstrom units radius and having been derived by reaction of aluminum chloride and HF, the amount HF and free chlorine being sufficient to ultimately form a substantial quantity of chlorofluorocarbon reaction products which contain a major weight proportion of chlorofluorocarbon compounds having at least three fluorine atoms, heating said mixture in said zone at temperature in the approximate range of 350–400° C. for a time sufficient to fluorinate a substantial amount of said $CCl_2=CCl_2$ to form chlorofluorocarbon reaction products containing a major weight proportion of chlorofluorocarbon compounds containing at least three fluorine atoms, discharging from said zone gaseous chlorofluorocarbon reaction products containing a major weight proportion of said saturated two-carbon-atom chlorofluorocarbon compounds having at least three fluorine atoms, and recovering said saturated compounds having at least three fluorine atoms.

4. The process of claim 3 in which the said catalyst has a crystallite size not substantially greater than 200 Angstrom units radius.

References Cited in the file of this patent

UNITED STATES PATENTS

| 1,996,115 | Lazier et al. | Apr. 2, 1935 |
|---|---|---|
| 2,471,525 | Hillyer et al. | May 31, 1949 |
| 2,554,857 | Gochenour | May 29, 1951 |
| 2,560,838 | Arnold | July 17, 1951 |
| 2,669,590 | Miller et al. | Feb. 16, 1954 |